United States Patent Office 3,012,025
Patented Dec. 5, 1961

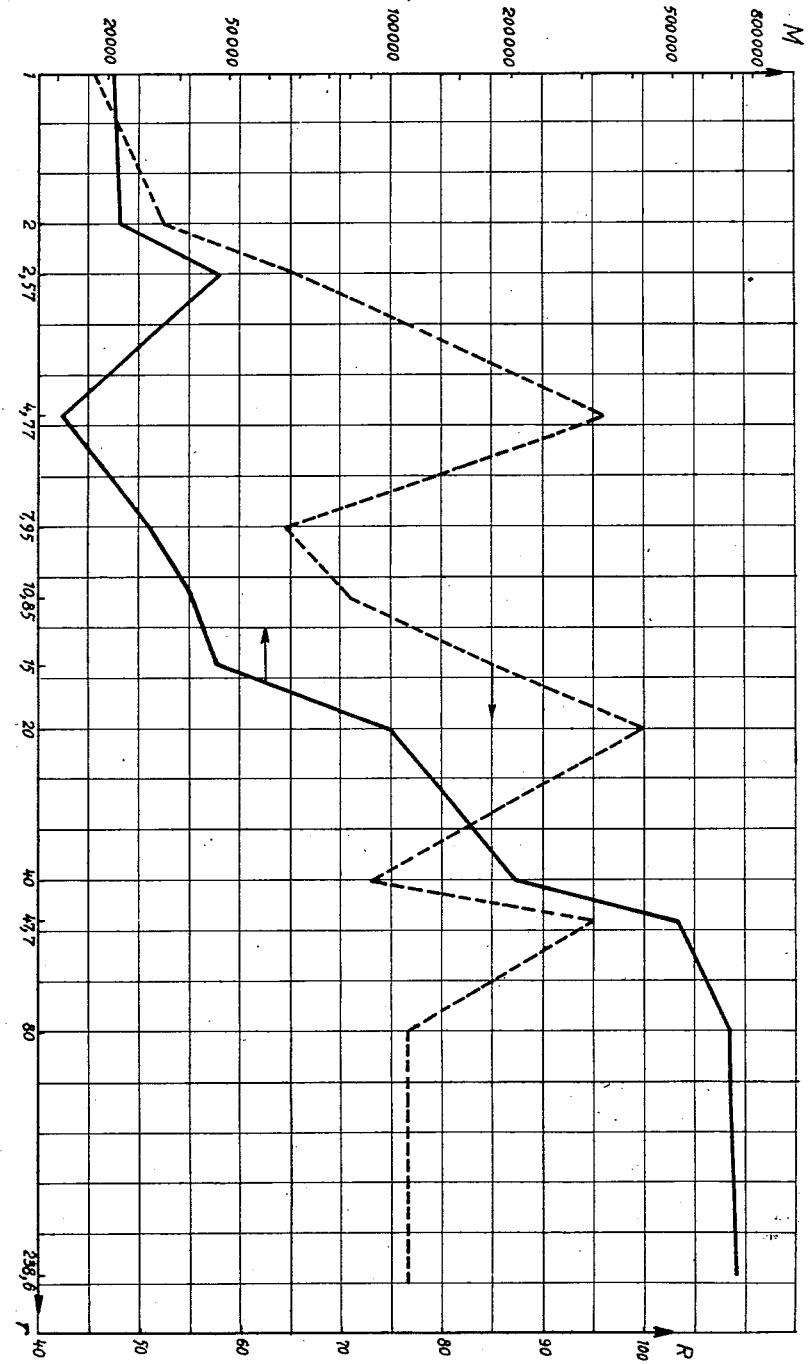

3,012,025
PROCESS FOR THE POLYMERIZATION OF ETHYLENE
Etienne Szarvasi, La Celle Saint Cloud, France, assignor to L'Air Liquide, Societe Anonyme Pour l'Etude et l'Exploitation des Procedes Georges Claude, Paris, France
Filed Feb. 5, 1959, Ser. No. 791,445
Claims priority, application France Feb. 13, 1958
6 Claims. (Cl. 260—94.9)

The present invention concerns a new process for the polymerisation of ethylene under relatively low pressure in an inert organic solvent, wherein the catalyst comprises two constituents, one of which is titanium tetrachloride. The invention also concerns the new catalysts for the polymerisation of ethylene which are employed in this process, as also a new variety of polyethylene.

It has already been proposed in French Patent No. 1,137,459 of August 1, 1955 to effect the polymerisation of ethylene in the presence of a catalyst consisting of a mixture of lithium hydride and titanium tetrachloride, or of aluminium-lithium hydride and titanium tetrachloride. These catalysts must be prepared from their constituents by successively crushing them in the solvent for several hours under an inert gas atmosphere. The yields and the properties of the polymers obtained are not indicated.

In contrast thereto, the process of the invention permits of polymerising ethylene in the presence of a catalyst which can be simply and rapidly prepared under a fairly low pressure, and even at atmospheric pressure or in the presence of a little moisture. It gives polyethylene of high molecular weight in very good and sometimes quantitative yields. If the proportions of the first and second constituents of the catalyst are appropriately chosen, it permits of obtaining polymers having the desired molecular weight, and more especially a variety of polyethylene of very high molecular weight, having physical and mechanical properties superior to those of the already known varieties.

This process is characterized in that the other constituent of the catalyst is formed by pre-heating aluminium chloride, in the presence of the inert organic solvent, with a hydride of an alkali metal, in a quantity lower than 3 molecules per molecule of aluminium chloride.

This pre-heating is preferably effected in the presence of ethylene, but it may take place in the presence of another olefine or of an inert gas or in the absence of gas. For example, it takes place in the receptacle which is subsequently to be employed for the polymerisation and which is thereafter allowed to cool before the titanium tetrachloride and the ethylene to be polymerised are added.

The second active constituent of the catalyst is neither aluminium chloride nor alkali hydride, but a novel combination formed in situ in the course of the heating of these substances. This novel combination is not a double hydride of aluminium and alkali metal, because the preparation of such a double hydride requires a quantity at least equal to 4 molecules of alkali hydride per molecule of aluminium chloride (Gaylord, "Reduction with complex metal hydrides," 1956, page 6). The nature of this novel combination is not known with certainty, and it probably depends upon the proportions of the initial products. It may be assumed that in some cases aluminium hydride is at least intermediately formed, because the aluminium chloride, in the presence of lesser than 3 molecules of alkali hydride, is reduced to the form of hydride $AlH_3$. There may also be formed in the presence of the ethylene alkyl derivatives of aluminium and alkali metal, or complex organic derivatives. The invention consists in any case in the use of any catalyst formed from the above-indicated constituents, and it is independent of the existence of any of the hypothetical compounds which may be present in the catalyst ready for use.

The proportions of aluminium chloride and alkali hydride may vary to some extent, provided that the molecular ratio of their quantities remains below 3. An excess of 25% of aluminium chloride, that is to say, a molecular ratio of 2.4, has proved satisfactory.

The proportions of titanium tetrachloride and other constituent of the catalyst may be modified within wide limits without prejudice to the production of polyethylene of suitable properties, notably for the manufacture of articles by moulding. However, polyethylenes of higher mean molecular weight are prepared by choosing these proportions in such manner that the molecular ratio of the initial quantity of aluminium chloride to that of titanium tetrachloride is between 20 and 250, and preferably between 45 and 250. The titanium tetrachloride is then present in the mixed catalyst only in an extremely small proportion, and appears only to perform the function of a polymerisation promoter.

The polymerisation may be carried out under a fairly low pressure, below 100 kg./cm.$^2$, and at moderate temperature, below 100° C. The best results are obtained with a pressure between 30 kg./cm.$^2$ and 50 kg./cm.$^2$ and at a temperature between 50° and 70° C., but it is possible to use lower pressures, and more especially to operate at atmospheric pressure.

The variety of polyethylene obtained when the aforesaid molecular ratio of aluminium chloride to titanium tetrachloride is between 45 and 250, the pressures and the temperature employed in the polymerisation being between 30 kg./cm.$^2$ and 50 kg./cm.$^2$ on the one hand, and 50° and 70° C. on the other hand, possesses a mean molecular weight between 400,000 and 800,000, and its physical and mechanical properties are superior to those of the other already known varieties. The Vicat softening point of these polyethylenes is between 135° and 145° C., their Brinell hardness between 0.22 and 0.26, and their tensile strength between 280 and 300 kg./cm.$^2$. In addition, in contrast to the usual rule for polymers of very high molecular weight, they are not brittle and retain remarkable elasticity.

The inert organic solvent employed in the polymerisation reaction may be an aliphatic, cyclanic or aromatic hydrocarbon, or a mixture of such hydrocarbons. The preferred solvent is xylene, but hexane, cyclohexane or petrolatum oil are also suitable.

There are hereinafter described by way of example a number of operations for the polymerisation of relatively humid ethylene (0.02% to 0.025% of water) by the process of the invention. One of the constituents of the catalyst is obtained from aluminium chloride and lithium hydride, subjected to heating at 120° C. in xylene for one hour in the presence of ethylene. After this heating, the titanium tetrachloride is added, whereafter ethylene is introduced into the autoclave under a pressure of 40 kg./cm.$^2$, and the polymerisation is carried out at a temperature in the neighbourhood of 60° C. Each time the pressure of the ethylene falls excessively, a further quantity is introduced into the apparatus. The reaction is carried out for 10½ hours in each instance.

The apparatus employed is a shaker-type hydrogenation autoclave of standard pattern. However, the use of an autoclave having vigorous internal agitation might be preferable, because the speed of absorption of the ethylene increases with the effectiveness of the agitation.

In the following examples, the relative proportions of the two constituents of the catalyst, expressed in molecular ratios of $AlCl_3/TiCl_4$, have been systemmatically modified between the limits of 1 and 250 so as to show the resultant variations of the mean molecular weight of the polyethylene obtained, of the weight of polyethylene obtained and of the yield of the transformation of the introduced ethylene into solid.

The mean molecular weights indicated in the following were determined from the intrinsic viscosity by the formula of Schulz and Blaschke (Journal für prakt. Chemie, 158 (1941), page 136). The intrinsic viscosity itself was calculated from specific viscosity measurements in xylene at 120° C. at various concentrations, with extrapolation by graphic means or by the formula of Schulz and Dinglinger (Journal für prakt. Chemie, 158 (1941), page 145).

In addition, the following properties were determined on specimens of some of the polymers obtained:

(a) Tensile strength, measured by the breaking load on test pieces measuring 10 mm. x 100 mm., cut from compression-moulded discs of a thickness of 2 to 3 mm.

(b) Brinell hardness, measured by the penetration of a 10 mm. ball under a load of 20 kg.

(c) Vicat softening point, measured by the temperature corresponding to a penetration of 1 mm. of a needle 1 mm.² in cross-section, under a load of 1 kg.

Example 1

$AlCl_3/TiCl_4=1$

There are heated in a one-litre autoclave at 120° C. for 1 hour:

16.75 g. (0.125 mol.) of aluminium chloride
2.4 g. (0.3 mol.) of lithium hydride in 250 cc. of xylene double-distilled over sodium, and in the presence of ethylene under a pressure of 40 kg./cm.².

The autoclave is allowed to cool, and there are then introduced under an argon atmosphere, 24 g. (0.125 mol.) of titanium tetrachloride dissolved in 20 cc. of xylene, whereafter ethylene is introduced under a pressure of 40 kg./cm.².

The mixture is heated to 45° C. The exothermic reaction raises the temperature to 60° C. Each time the ethylene pressure falls, a further quantity thereof is introduced, the effect of which is to maintain the temperature at 60° C. for 5 hours 40 minutes. External heating is subsequently necessary to maintain this temperature.

The reaction is stopped after 10½ hours, the quantity of ethylene consumed having been 380 g.

The product contained in the autoclave is introduced into 1 litre of methanol. On cessation of the boiling produced by the decomposition of the residues of the catalyst, the product is suction-filtered. The solid is thereafter heated at boiling point for 2 hours in methanol containing 30% of hydrochloric acid. After suction-filtering and washing of the product with water, it is allowed to stand overnight under acetone. There are obtained 173 g. of white powder, having an ash content of 0.2%.

Yield of transformation into solid: 45.5%.
Viscosity limit: 0.845.
Mean molecular weight: 20,400.
Tensile strength: 123 kg./cm.².
Brinell hardness: 0.31 mm.
Vicat softening point: 116° C.

Example 2

$AlCl_3/TiCl_4=2$

Only 11.9 g. (0.0627 mol.) of titanium tetrachloride are employed, the other quantities and the mode of operation remaining the same as those in Example 1.

The exothermic reaction continues for 4½ hours.
Weight of ethylene consumed: 330 g.
Weight of white solid obtained: 173 g.
Transformation yield: 52.5%.
Viscosity limit: 0.893.
Tensile strength: 141 kg./cm.².
Brinell hardness: 0.26 mm.
Vicat softening point: 104° C.

Example 3

$AlCl_3/TiCl_4=2.57$

The same quantities of catalyst are employed, but only 9.5 g. (0.05 mol.) of titanium tetrachloride. The exothermic reaction lasts for more than 8 hours.

Weight of ethylene consumed: 370 g.
Weight of white solid obtained: 245 g.
Ash content: 0.18%.
Solid yield: 66%.
Viscosity limit: 1.39.
Mean molecular weight: 37,700.

Example 4

$AlCl_3/TiCl_4=2.57$

The procedure of the preceding example is followed, but 0.9 g. (0.05 mol.) of water is added at the same time as the titanium tetrachloride in order to study the influence of the presence of water in the reaction mixture. The temperature is maintained at 65° C. for 10½ hours.

Weight of ethylene consumed: 90 g.
Weight of white solid obtained: 37 g.
Solid yield: 41%.
Viscosity limit: 1.58.
Mean molecular weight: 44,000.

A reduction in the quantity of polymer obtained is noted, as also a reduction of the solid yield. On the other hand, the mean molecular weight is higher. This may be attributed to a partial inactivation of the titanium tetrachloride, which results in a raising of the true $AlCl_3/TiCl_4$ ratio. It will be seen from the following examples that generally speaking the molecular weight rises when this ratio increases.

Example 5

The procedure of Example 3 is followed, but the catalyst is formed in the absence of ethylene. Aluminum chloride and lithium hydride are initially heated in xylene in the autoclave for 1 hour at 120° C., and then allowed to cool, whereafter the titanium tetrachloride and the ethylene are introduced.

Weight of ethylene consumed: 180 g.
Weight of white solid obtained: 153 g.
Ash content: 0.33%.
Solid yield: 85%.
Viscosity limit: 1.34.
Mean molecular weight: 36,000.
Tensile strength: 221 kg./cm.².
Brinell hardness: 0.18 mm.
Vicat softening point: 124° C.

Example 6

$AlCl_3/TiCl_4=4.77$

The procedure of Examples 1 to 3 is followed, but with only 5 g. (0.0264 mol.) of $TiCl_4$.

The reaction is slightly exothermic for about 2 hours. Continuous heating is necessary for the remainder of the time in order to maintain the temperature at 65° C.

Weight of ethylene consumed: 180 g.
Weight of white solid obtained: 172 g.
Solid yield: 96%.
Viscosity limit: 0.67.
Mean molecular weight: 15,300.

Example 7

$AlCl_3/TiCl_4 = 7.95$

Quantity of $TiCl_4$: 3 g. (0.0158 mol.).
The exothermic reaction lasts for about 4½ hours.
Weight of ethylene consumed: 310 g.
Weight of white solid obtained: 200 g.
Solid yield: 64.5%.
Viscosity limit: 1.0.
Mean molecular weight: 25,000.
Tensile strength: 176 kg./cm.$^2$.
Brinell hardness: 0.22 mm.
Vicat softening point: 118° C.

Example 8

$AlCl_3/TiCl_4 = 10.86$

Quantity of $TiCl_4$: 2.2 g. (0.0116 mol.).
Duration of the exothermic reaction: 5½ hours.
Weight of ethylene consumed: 260 g.
Weight of white solid obtained: 184 g.
Ash content: 0.12%.
Solid yield: 71%.
Viscosity limit: 1.24.
Mean molecular weight: 32,000.
Tensile strength: 142 kg./cm.$^2$.
Brinell hardness: 0.25 mm.
Vicat softening point: 114° C.

Example 9

$AlCl_3/TiCl_4 = 15$

Quantity of $TiCl_4$: 1.6 g. (0.00838 mol.).
The exothermic reaction continues for 7 hours.
Weight of ethylene consumed: 280 g.
Weight of white solid obtained: 240 g.
Ash content: 0.066%.
Solid yield: 85.6%.
Viscosity limit: 1.37.
Mean molecular weight: 37,000.
Tensile strength: 92 kg./cm.$^2$.
Brinell hardness: 0.32 mm.
Vicat softening point: 108° C.

Example 10

$AlCl_3/TiCl_4 = 20$

Quantity of $TiCl_4$: 1.2 g. (0.00629 mol.).
Weight of ethylene consumed: 182 g.
Weight of white solid obtained: 182 g.
Ash content: 0.18%.
Solid yield: 100%.
Viscosity limit: 3.03.
Mean molecular weight: 98,700.
Tensile strength: 217 kg./cm.$^2$.
Brinell hardness: 0.36 mm.
Vicat softening point: 127° C.

Example 11

$AlCl_3/TiCl_4 = 40$

Quantity of $TiCl_4$: 0.6 g. (0.00314 mol.).
Weight of ethylene consumed: 90 g.
Weight of white solid obtained: 66 g.
Solid yield: 73%.
Viscosity limit: 5.44.
Mean molecular weight: 203,000.

Example 12

$AlCl_3/TiCl_4 = 47.7$

Quantity of $TiCl_4$: 0.5 g. (0.00263 mol.).
Weight of ethylene consumed: 60 g.
Weight of white solid obtained: 57 g.
Solid yield: 95%.
Viscosity limit: 11.47.
Mean molecular weight: 511,000.

Example 13

$AlCl_3/TiCl_4 = 80$

The quantity of titanium tetrachloride is 0.3 g. (0.00157 mol.).
Weight of ethylene consumed: 60 g.
Weight of white solid obtained: 46 g.
Solid yield: 76.5%.
Ash content: 0.21%.
Viscosity limit: 14.72.
Mean molecular weight: 695,000.

Example 14

$AlCl_3/TiCl_4 = 238.6$

Quantity of titanium tetrachloride: 0.1 g. (0.000527 mol.).
Weight of ethylene consumed: 60 g.
White of white solid obtained: 46 g.
Solid yield: 76.5%.
Ash content: 0.24%.
Viscosity limit: 15.08.
Mean molecular weight: 716,000.

The mechanical properties of this polymer are the following:

Tensile strength: 287 kg./cm$^2$.
Elongation: 120%.
Brinell hardness: 0.25 mm.
Vicat softening point: 144° C.

It may be noted that in the last four examples the weight of ethylene consumed and of solid polyethylene are fairly low, but this does not appear to be the result of an appreciable reduction in the speed of reaction, but rather of stoppages caused by the formed polymer in the tube for the introduction of the ethylene.

The accompanying drawing illustrates as a function of the molecular ratio $AlCl_3/TiCl_4 = r$ the variations of the mean molecular weight M and of the solid polymer yield R obtained in the foregoing examples. It will be noted that there exists a relative maximum of the mean molecular weight towards a ratio r of 2.5, and above all that the molecular weight rises rapidly when the ratio r changes from 15 to 45, while it rises more slowly for a ratio above 45. The solid polymer yield R is always high, except with some low molecular ratios.

By way of comparison, there are given in the following table the characteristic properties, on the one hand of one of the better qualities of polyethylene produced by the Ziegler low-pressure polymerisation process, i.e. the product sold under the trade name "Super-Dylan" by the Koppers Co., and on the other hand of a number of samples of polyethylene manufactured by the process of the invention.

| Sample | Molecular weight | Tensile strength, kg./cm.$^2$ | Elongation at rupture, percent | Brinell hardness, mm. | Vicat softening point d, ° C. |
|---|---|---|---|---|---|
| Super-Dylan | 60,000 | 217 | | 0.36 | 128 |
| Ex. 10 | 98,700 | 217 | | 0.36 | 127 |
| Ex. 11 | 203,000 | 227 | 470 | 0.29 | 131 |
|  | 280,000 | 251 | 320 | 0.19 | 134 |
|  | 400,000 | 280 | 220 | 0.22 | 137 |
|  | 480,000 | 280 | 180 | 0.22 | 137 |
| Ex. 12 | 511,000 | 287 | 160 | 0.22 | 139 |
| Ex. 14 | 716,000 | 287 | 120 | 0.25 | 144 |

The mechanical properties of the polyethylenes of the invention having a mean molecular weight between 100,000 and 400,000 are equal to or superior to those of "Super-Dylan." Those having a mean molecular weight higher han 400,000, obtained with the aid of catalysts having a low titanium tetrachloride content ($AlCl_3/TiCl_4$ ratio higher than 45), possess very superior properties to "super-Dylan" and other known varieties. It will also be noted that in this field of high molecular weights even a fairly small increase in mean molecular weight is accom-

What I claim is:

1. A process for the catalytic polymerization of ethylene under relatively low pressure in an inert hydrocarbon solvent, comprising the steps of preparing a first component of the catalyst by heating together in the presence of the inert hydrocarbon solvent, aluminum chloride and lithium hydride in a ratio less than 3 molecules per molecule of aluminum chloride, adding thereto titanium tetrachloride as the second component of the catalyst in such an amount that the molecular ratio of the initial aluminum chloride to titanium tetrachloride is between 40 and 250, and bringing ethylene into contact with the mixed catalyst.

2. A process according to claim 1, wherein the molecular ratio of lithium hydride to aluminum chloride is about 2.4.

3. A process according to claim 1, wherein the heating is carried out in the presence of ethylene.

4. A process according to claim 1, wherein the ethylene is polymerized under a pressure between 30 kg./cm.$^2$ and 50 kg./cm.$^2$ and at a temperature between 50° C. and 70° C.

5. A mixed catalyst for the polymerization of ethylene under relatively low pressure in an inert hydrocarbon solvent, comprising as one of its components the material prepared by heating together in the presence of the inert hydrocarbon solvent aluminium chloride and lithium hydride, in a ratio less than 3 molecules per molecule of aluminum chloride, and as the other component, titanium tetrachloride, in such an amount that the molecular ratio of the initial aluminum chloride to titanium tetrachloride is between 40 and 250.

6. A mixed catalyst according to claim 5, wherein the molecular ratio of lithium hydride to titanium tetrachloride is about 2.4.

References Cited in the file of this patent

UNITED STATES PATENTS

| | | |
|---|---|---|
| 2,567,972 | Schlesinger | Sept. 18, 1951 |
| 2,727,024 | Field et al. | Dec. 13, 1955 |
| 2,816,883 | Larchar | Dec. 17, 1957 |
| 2,839,518 | Brebner | June 17, 1958 |
| 2,862,917 | Anderson | Dec. 2, 1958 |
| 2,886,561 | Reynolds et al. | May 12, 1959 |
| 2,905,645 | Anderson et al. | Sept. 22, 1959 |

FOREIGN PATENTS

| | | |
|---|---|---|
| 533,362 | Belgium | May 16, 1955 |
| 1,137,459 | France | Jan. 14, 1957 |
| 1,158,724 | France | Jan. 27, 1958 |

OTHER REFERENCES

Inorganic Chemistry (Moeller), published by John Wiley & Sons (N.Y.), 1952 (page 786 relied on).